UNITED STATES PATENT OFFICE.

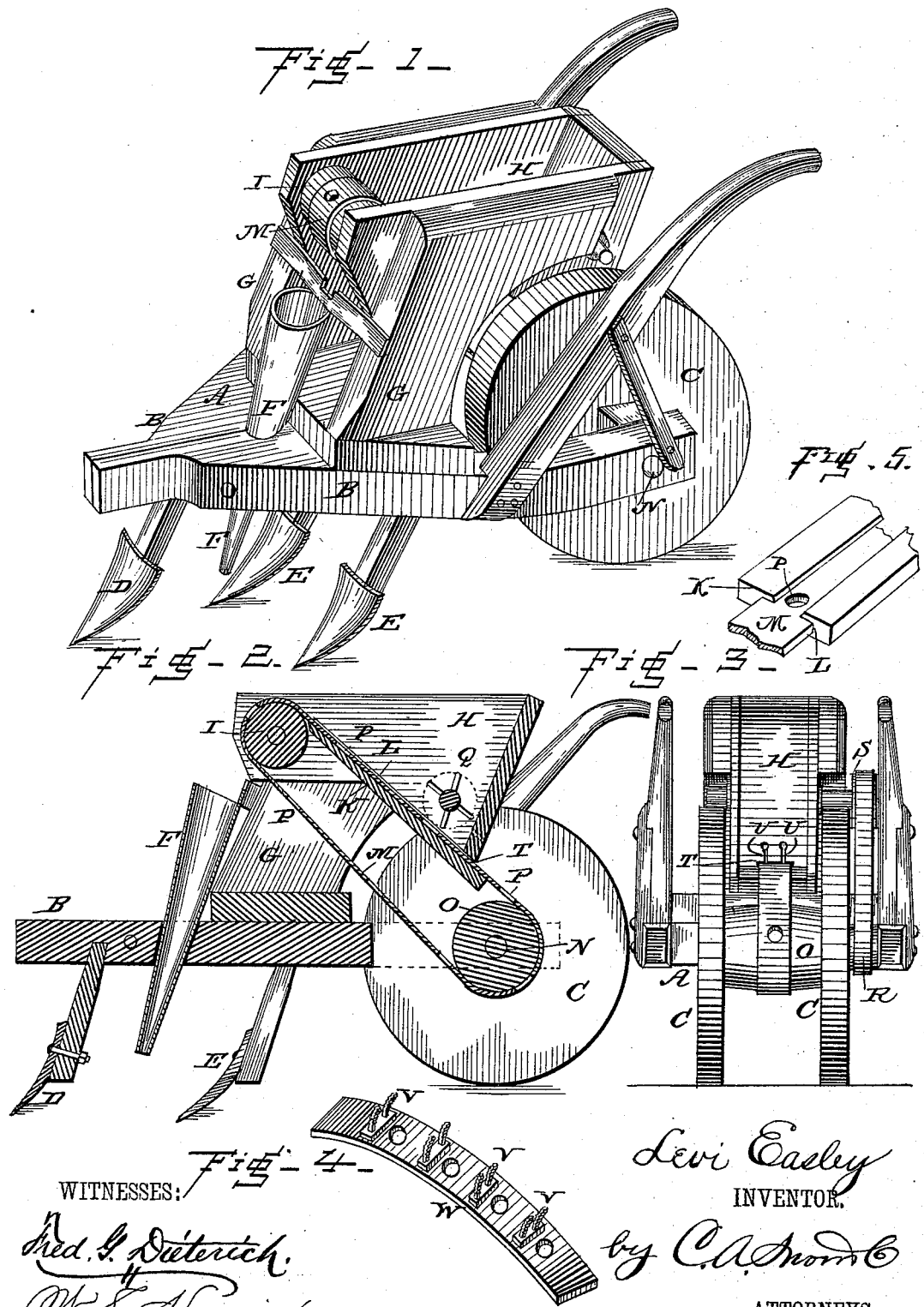

LEVI EASLEY, OF WHITT, TEXAS.

COTTON AND CORN PLANTER.

SPECIFICATION forming part of Letters Patent No. 316,018, dated April 21, 1885.

Application filed May 27, 1884. (No model.)

*To all whom it may concern:*

Be it known that I, LEVI EASLEY, a citizen of the United States, residing at Whitt, in the county of Parker and State of Texas, have invented a new and useful Cotton and Corn Planter, of which the following is a specification, reference being had to the accompanying drawings.

This invention has relation to combined cotton and corn planters; and it consists in the construction and novel arrangement of parts, as will be hereinafter fully described, and particularly pointed out in the claim.

Figure 1 is a view in perspective of a combined cotton and corn planter embodying my improvements. Fig. 2 is a vertical longitudinal sectional view. Fig. 3 is a rear elevation, and Fig. 4 is a detail view of the cotton-planting belt. Fig. 5 is a detached perspective view of a portion of the inclined front wall of the hopper, showing the endless belt working in a groove thereof, to prevent lateral movement.

Referring by letter to the accompanying drawings, A designates the frame of the planter, which consists of the beams B B, bolted together at their forward ends and diverging rearwardly, nearly in the form of a triangle, the extreme rear ends extending parallel to each other to form the bearings for the axle of the supporting and driving-wheels C C.

D indicates the opening-plow, near the front of the frame, and E E are the covering-plows, in rear of the seed-tube F, which is secured to the standards G G, that support the seed-hopper H, and passes down through the frame A, in front of the hopper, as shown. A roller, I, is journaled in the side walls of the hopper H, at its front and near the upper end of the hopper. The front wall, K, of the hopper is inclined, as shown, and is provided with a guide-groove, L, in which the dropper-belt M travels when the planter is operated. The shaft or axle N is provided with a drum, O, between the wheels C C, and the dropper-belt M travels over this drum and the roller I, the wheels imparting motion to the drum, and the latter giving the motion to the belt. The belt is provided with openings P, which form the seed-cups. These seed-cups may vary in number and size to conform to the distance required between the hills in the row and to the kind of seed to be dropped. The hopper H is provided near its rear wall with a rotary agitator, Q, which is operated by a belt, R, running from the axle to a pulley, S, on the end of the agitator-shaft, outside of the hopper. The rear wall of the hopper is also inclined, as shown, and extends down nearly to the lower end of the front wall, and is recessed in its lower edge to form an opening, T, through which the dropper-belt passes.

Communicating with the recess T are two vertical slots, U U, through which the hooks V V on the belt W, which is used when planting cotton-seed, pass. These hooks V V are arranged in pairs below each of the seed-cups, and the seed-cups in this belt are smaller and more numerous than those in the belt for dropping corn.

The agitator is intended for use only in planting cotton-seed, but it always remains in the hopper, as it does not interfere with corn or other seed. The only change that is required to plant different kinds of seed is in the belt having the seed-cups. By changing the belt for one having the desired number and size of seed-cups any kind of seed may be planted with this machine.

In planting cotton the quantity dropped is regulated by the length of the teeth; in other kinds of seeds, by the size of the openings.

Having thus fully described my invention, what I claim as new, and desire to secure by Letters Patent of the United States, is—

In combination with the hopper having its front wall inclined and formed with a guide-groove, L, the inner wall of which is cut out, the belt having its side edges working in the groove, and having hooks V attached to the same between the side edges, said hooks projecting through the cut-out portion of the groove, so as to have free communication with the seed in the hopper, as set forth.

In testimony that I claim the foregoing as my own I have hereto affixed my signature in presence of two witnesses.

LEVI EASLEY.

Witnesses:
W. C. THOMPSON,
R. F. ELLIS.